United States Patent
Gupta et al.

(10) Patent No.: US 9,515,565 B2
(45) Date of Patent: Dec. 6, 2016

(54) HYBRID HIGH VOLTAGE DIRECT CURRENT CONVERTER SYSTEMS

(71) Applicant: General Electric Company, Schenectady, NY (US)

(72) Inventors: Ranjan Kumar Gupta, Schenectady, NY (US); Luis Jose Garces, Niskayuna, NY (US); Ravisekhar Nadimpalli Raju, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 183 days.

(21) Appl. No.: 14/200,937

(22) Filed: Mar. 7, 2014

(65) Prior Publication Data

US 2015/0256093 A1    Sep. 10, 2015

(51) Int. Cl.
*H02M 5/458* (2006.01)
*H02J 3/36* (2006.01)
(Continued)

(52) U.S. Cl.
CPC .............. *H02M 5/4585* (2013.01); *H02J 3/36* (2013.01); *H02M 1/12* (2013.01); *H02M 7/162* (2013.01);
(Continued)

(58) Field of Classification Search
CPC ........ H02J 3/36; H02M 5/4585; H02M 5/453; H02M 7/7575; H02M 5/458; H02M 5/4505; H02H 7/261; H02H 7/268
(Continued)

(56) References Cited

U.S. PATENT DOCUMENTS

| 3,959,719 A | 5/1976 | Espelage |
|---|---|---|
| 4,263,517 A | 4/1981 | Konishi |

(Continued)

FOREIGN PATENT DOCUMENTS

| CN | 1832318 A | 9/2006 |
|---|---|---|
| CN | 101976836 A | 2/2011 |

(Continued)

OTHER PUBLICATIONS

Agelidis et al., "Recent Advances in High-Voltage Direct Current Power Transmission Systems", Industrial Technology, pp. 206-213, Dec. 2006.
(Continued)

*Primary Examiner* — Gary L Laxton
*Assistant Examiner* — Kyle J Moody
(74) *Attorney, Agent, or Firm* — Nitin N. Joshi

(57) ABSTRACT

A hybrid HVDC converter system includes at least one alternating current (AC) conduit, at least one transformer coupled to said at least one AC conduit, and at least one direct current (DC) conduit. The hybrid HVDC converter system also includes at least one capacitor commutated converter (CCC) configured to convert AC voltages and AC currents to a DC voltage and DC current. The at least one CCC is coupled to the at least one AC conduit through the at least one transformer. The hybrid HVDC converter system further includes at least one self-commutated converter (SCC) configured to convert AC voltages and AC currents to a regulated DC voltage and DC current. The at least one SCC includes at least one AC/DC stage and at least one DC/DC stage coupled to the at least one AC/DC stage.

29 Claims, 9 Drawing Sheets

(51) Int. Cl.
*H02M 1/12* (2006.01)
*H02M 7/162* (2006.01)
*H02M 7/521* (2006.01)
*H02M 3/158* (2006.01)
*H02M 1/00* (2006.01)
*H02M 7/483* (2007.01)
*H02M 7/757* (2006.01)

(52) U.S. Cl.
CPC ............ *H02M 7/521* (2013.01); *H02M 3/158* (2013.01); *H02M 7/7575* (2013.01); *H02M 2001/007* (2013.01); *H02M 2001/0077* (2013.01); *H02M 2007/4835* (2013.01); *Y02E 60/60* (2013.01)

(58) Field of Classification Search
USPC ....................................................... 363/34–37
See application file for complete search history.

(56) References Cited

U.S. PATENT DOCUMENTS

| | | | |
|---|---|---|---|
| 4,517,635 A | 5/1985 | Kelley, Jr. | |
| 5,202,583 A | 4/1993 | Larsen et al. | |
| 5,515,264 A * | 5/1996 | Stacey | H02M 7/49 363/132 |
| 5,535,113 A | 7/1996 | Konishi | |
| 5,751,563 A | 5/1998 | Bjorklund | |
| 5,910,889 A | 6/1999 | Larsen et al. | |
| 6,108,223 A | 8/2000 | Julian et al. | |
| 6,963,187 B2 | 11/2005 | Bebic et al. | |
| 8,030,791 B2 | 10/2011 | Lang et al. | |
| 8,203,856 B2 | 6/2012 | Radbrandt | |
| 8,300,435 B2 | 10/2012 | Bjorklund et al. | |
| 8,498,133 B2 | 7/2013 | Papafotiou et al. | |
| 8,830,712 B2 * | 9/2014 | Fischer de Toledo | H02J 3/16 363/138 |
| 8,847,430 B2 | 9/2014 | Juhlin | |
| 8,854,843 B2 * | 10/2014 | Trainer | H02J 3/36 363/35 |
| 8,934,268 B2 * | 1/2015 | Trainer | H02J 3/36 323/205 |
| 2007/0216390 A1 | 9/2007 | Wai et al. | |
| 2009/0279328 A1 | 11/2009 | Jiang-Hafner | |
| 2010/0309698 A1 | 12/2010 | Asplund et al. | |
| 2011/0310641 A1 | 12/2011 | Asplund et al. | |
| 2012/0043923 A1 | 2/2012 | Ikriannikov et al. | |
| 2012/0092904 A1 | 4/2012 | Nuqui et al. | |
| 2012/0250371 A1 | 10/2012 | Fischer De Toledo | |
| 2013/0063981 A1 | 3/2013 | Dujic et al. | |
| 2014/0146582 A1* | 5/2014 | Gupta | H02M 7/7575 363/35 |
| 2014/0268926 A1* | 9/2014 | Gupta | H02M 5/44 363/35 |
| 2015/0256094 A1* | 9/2015 | Chaudhuri | H02M 5/4585 363/35 |

FOREIGN PATENT DOCUMENTS

| | | |
|---|---|---|
| CN | 102394557 A | 3/2012 |
| CN | 102449870 A | 5/2012 |
| CN | 102738819 A | 10/2012 |
| CN | 102904242 A | 1/2013 |
| CN | 102969732 A | 3/2013 |
| CN | 103023058 A | 4/2013 |
| EP | 2556585 A1 | 2/2013 |
| WO | 9522848 A1 | 8/1995 |
| WO | 2010069371 A1 | 6/2010 |
| WO | 2011124258 A1 | 10/2011 |
| WO | 2011124260 A1 | 10/2011 |
| WO | 2011134521 A1 | 11/2011 |
| WO | 2012130296 A1 | 10/2012 |
| WO | 2013071975 A1 | 5/2013 |
| WO | 2013079937 A2 | 6/2013 |
| WO | 2014158514 A1 | 10/2014 |

OTHER PUBLICATIONS

Yang et al., "Study on Capacitor Commutated Converter Applied in HVDC projects", Power Engineering Society General Meeting, IEEE, pp. 1-5, Jun. 2007.

Flourentzou et al., "VSC-Based HVDC Power Transmission Systems: An Overview", IEEE Transactions on Power Electronics, vol. No. 24 , Issue No. 3, pp. 592-602, Mar. 2009.

Torres-Olguin et al., Integration of Offshore Wind Farm Using a Hybrid HVDC Transmission Composed by the PWM Current-Source Converter and Line-Commutated Converter, IEEE Transactions on Energy Conversion, vol. No. 28 , Issue No. 1, pp. 125-134, Mar. 2013.

Feldman et al., "A Hybrid Modular Multilevel Voltage Source Converter for HVDC Power Transmission", IEEE Transactions on Industry Applications, vol. No. 49 , Issue No. 4, pp. 1577-1588, Jul.-Aug. 2013.

Zhang et al., "Hybrid Multilevel Converter: Capacitor Voltage Balancing Limits and its Extension", IEEE Transactions on Industrial Informatics, vol. No. 9, Issue No. 4, pp. 2063-2073, Nov. 2013.

International Search Report and Written Opinion issued in connection with corresponding PCT Application No. PCT/US2015/018224 on Jun. 29, 2015.

Honglin Zhou, et al. Control of DFIG-Based Wind Farms with Hybrid HVDC Connection, IEEE, 2009, pp. 1085-1091.

Behazad Qahraman, Series/Parallel Hybrid VSC-LCC for HVdc Transmission Systems, Department of Electrical and Computer Engineering, Univesity of Manitoba, 2010, 171 pages.

Omar Kotb, A Hyrbrid LCC-VSC HVDC, University of Ontario Institute of Technology, 2010, 107 pages.

P.F. De Toledo, et al., Frequency Domain Model of an HVDC Link with a Line-Commutated Current-source Converter. Part 1: Fixed Overlap, IET Gener. Transm. Distrib., 2009, 757-770, vol. 3, iss. 8, The Institution of Engineering and Technology.

Luke Livermore, et al., MTDC VSC Technology and its Applications for Wind Power, 6 pages.

Capacitor Commutated Converter, CCC, 18 pages, ABB.

Menzies, Donald F., et al., "Garabi" the Argentina—Brazil 1000 MW Interconnection Commissioning and Early Operating Experience, ERLAC Conference, 2001, 5 pages.

Graham, John, et al., The Garabi 2000 MW Interconnection back-to-Back HVDC to Connect WEak AC Systems, ABB Utilities, 8 pages.

Andersen, Bjarne R., et al., Hybrid HVDC System for Power Transmission to Island Networks, IEEE Transcations on Power Delivery, 2004, 1884-1890, vol. 19, No. 4.

Barthurst G.N., et al., Harmonic Modelling of Networks Containing Line-Commutated Voltage-sourced Coverters, 14th PSCC, 2002, 7 pages, Session 28, Paper 1.

Qahraman, B. and Gole, A., "A VSC Based Series Hybrid Converter for HVDC Transmission," CCECE/CCGEI, Saskatoon, May 2005, pp. 458-461.

U.S. Appl. No. 13/826,583, filed Mar. 14, 2013, entitled High Voltage Direct Current (HVDC) Converter System and Method of Operating the Same.

U.S. Appl. No. 13/688,658, filed Nov. 29, 2012, entitled High Voltage Direct Current (HVDC) Converter System and Method of Operating the Same.

U.S. Appl. No. 13/629,882, filed Sep. 28, 2012 entitled Multilevel Converter System.

Qahraman B et al, "Hybrid HVDC Converters and Their Impact on Power System Dynamic Performance," 2006 IEEE Power Engineering Society General Meeting; Jun. 18-22, 2006; Montreal, Que.'Canada, IEEE, Piscataway, NJ' USA, Jun. 18, 2006, pp. 1-6.

Andersen B R et al: "Hybrid HVDC system for power transmission to island networks", 2003 IEEE PES Transmission and Distribution Conference. Conference Proceedings. Dallas, TX, Sep. 7-12, 2003; [IEEE/PES Transmission and Distribution Conference and Exposition], New York, NY : IEEE, US, vol. 1, Sep. 7, 2003, pp. 55-60.

Hongbo Jiang et al: "Harmonic Cancellation of a Hybrid Converter", IEEE Transactions on Power Delivery, IEEE Service Center, New York, NY, US, vol. 13 , No. 4, Oct. 1, 1998, pp. 1291-1296.

(56) References Cited

OTHER PUBLICATIONS

Mohamed H Okba et al: "Harmonics in HVDC Links, part II Effects and reduction techniques", IECON 2012—38th Annual Conference on IEEE Industrial Electronics Society, IEEE, Oct. 25, 2012, pp. 1328-1336.

International Search Report, dated Jun. 5, 2014, for International application No. PCT/US2014/017587, filed Feb. 21, 2014 (15 pgs.).

Lin et al., "Adaptive Voltage Regulation and Equal Current Distribution of Parallel-Buck DC-DC Converters Using Backstepping Sliding Mode Control," 30th Annual Conference of IEEE, vol. No. 2, pp. 1018-1023, Nov. 2-6, 2004.

Weihao et al., "Modeling and Control of Zero-Sequence Current in Multiple Grid Connected Converter," Power Electronics Specialists Conference, Jun. 15-19, 2008, pp. 2064-2069.

Torres-Olguin et al., "A Model-based Controller in Rotating Reference Frame for Hybrid HVDC," Energy Conversion Congress and Exposition (ECCE), Sep. 12-16, 2010, pp. 1578-1584.

PCT Search Report and Written Opinion for corresponding PCT patent application No. PCT/US2015/018015, dated Jun. 11, 2015.

\* cited by examiner

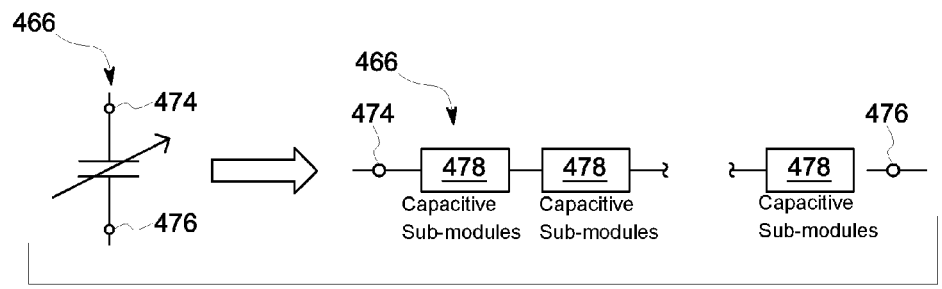
FIG. 5
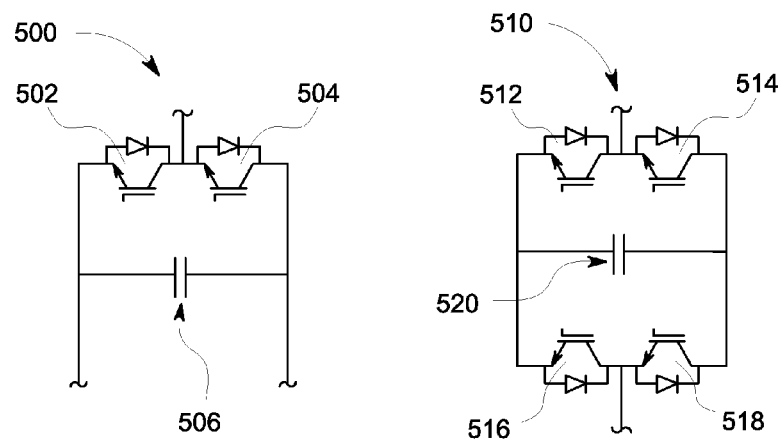
FIG. 6
(PRIOR ART)
FIG. 7
(PRIOR ART)

HYBRID HIGH VOLTAGE DIRECT CURRENT CONVERTER SYSTEMS

BACKGROUND

The field of the invention relates generally to high voltage direct current (HVDC) transmission systems and, more particularly, to hybrid HVDC converter systems.

At least some of known electric power generation facilities are physically positioned in a remote geographical region or in an area where physical access is difficult. One example includes power generation facilities geographically located in rugged and/or remote terrain, for example, mountainous hillsides, extended distances from the customers, and off-shore, e.g., off-shore wind turbine installations. More specifically, these wind turbines may be physically nested together in a common geographical region to form a wind turbine farm and are electrically coupled to a common alternating current (AC) collector system. Many of these known wind turbine farms include a separated power conversion assembly, or system, electrically coupled to the AC collector system. Such known separated power conversion assemblies include a rectifier portion that converts the AC generated by the power generation facilities to direct current (DC) and an inverter that converts the DC to AC of a predetermined frequency and voltage amplitude. The rectifier portion of the separated power conversion assembly is positioned in close vicinity of the associated power generation facilities and the inverter portion of the separated full power conversion assembly is positioned in a remote facility, such as a land-based facility. Such rectifier and inverter portions are typically electrically connected via submerged high voltage direct current (HVDC) electric power cables that at least partially define an HVDC transmission system.

Many known power converter systems include converters, e.g., line commutated converters (LCCs). LCC-based converters typically use thyristors to "chop" three-phase AC voltage through firing angle control to generate a variable DC output voltage. Also, a "black start" using such a HVDC transmission system is not possible. Further, such known thyristor-based rectifiers/inverters require significant reactive power from the AC grid to the thyristors, with some reactive power requirements representing approximately 50% to 60% of the rated power of the converter. Moreover, thyristor-based converters facilitate significant generation of harmonic currents flowing into the AC grid, e.g., the $11^{th}$ and $13^{th}$ harmonics, such harmonic currents typically approximately 10% of the present current loading for each of the $11^{th}$ and $13^{th}$ harmonics. Therefore, to compensate for the harmonic currents and reactive power, large AC filters are installed in the associated AC switchyard. In some known switchyards, the size of the AC filter portion is at least 3 times greater than the size of the associated thyristor-based converter portion. Such AC filter portion of the switchyard is capital-intensive due to the land required and the cost and size of large equipment installed. In addition, a significant investment in replacement parts and preventative and corrective maintenance activities increases operational costs.

In addition, most known LCC-based HVDC converters are not configured to transmit HVDC power at voltages in excess of 800 kiloVolts (kV). As transmission voltages increase, an efficiency of power transmission also tends to increase.

BRIEF DESCRIPTION

In one aspect, a hybrid high voltage direct current (HVDC) converter system is provided. The hybrid HVDC converter system includes at least one alternating current (AC) conduit, at least one transformer coupled to said at least one AC conduit, and at least one direct current (DC) conduit. The hybrid HVDC converter system also includes at least one capacitor commutated converter (CCC) configured to convert AC voltages and AC currents to a DC voltage and DC current. The at least one CCC is coupled to the at least one AC conduit through the at least one transformer. The hybrid HVDC converter system further includes at least one self-commutated converter (SCC) configured to convert AC voltages and AC currents to a regulated DC voltage and DC current. The at least one SCC includes at least one AC/DC stage and at least one DC/DC stage coupled to the at least one AC/DC stage.

In a further aspect, a hybrid high voltage direct current (HVDC) converter system is provided. The system includes at least one alternating current (AC) conduit, at least one transformer coupled to the at least one AC conduit, and at least one direct current (DC) conduit. The system also includes at least one capacitor commutated converter (CCC) configured to convert AC voltages and AC currents to a DC voltage and DC current. The at least one CCC is coupled to the at least one AC conduit through the at least one transformer. The system further includes at least one self-commutated converter (SCC) configured to convert AC voltages and currents to a regulated DC voltage and DC current. The at least one SCC includes at least one AC/DC stage including a plurality of AC terminals, a plurality of DC terminals, and a plurality of switching power poles coupled to the plurality of AC terminals and coupled to the plurality of DC terminals. The at least one SCC also includes at least one DC/DC stage coupled to the at least one AC/DC stage through the plurality of DC terminals.

In another aspect, a hybrid high voltage direct current (HVDC) converter system is provided The system includes at least one alternating current (AC) conduit, at least one transformer coupled to the at least one AC conduit, and at least one direct current (DC) conduit. The system also includes at least one capacitor commutated converter (CCC) configured to convert AC voltages and AC currents to a DC voltage and DC current. The at least one CCC is coupled to the at least one AC conduit through the at least one transformer. The system further includes at least one self-commutated converter (SCC) configured to convert AC voltages and currents to a regulated DC voltage and DC current. The at least one SCC includes at least one AC/DC stage including a plurality of AC terminals, a plurality of DC terminals, and a plurality of switching power poles coupled to the plurality of AC terminals.

DRAWINGS

These and other features, aspects, and advantages of the present invention will become better understood when the following detailed description is read with reference to the accompanying drawings in which like characters represent like parts throughout the drawings, wherein:

FIG. 5 is a schematic view of a plurality, i.e., an exemplary set of capacitive sub-modules that may be used with the HVDC converter system shown in FIG. 4;

FIG. 6 is a schematic view of an exemplary capacitive sub-module that may be used with the set of capacitive sub-modules shown in FIG. 5;

FIG. 7 is a schematic view of an alternative capacitive sub-module that may be used with the set of capacitive sub-modules shown in FIG. 5;

Figure 1:
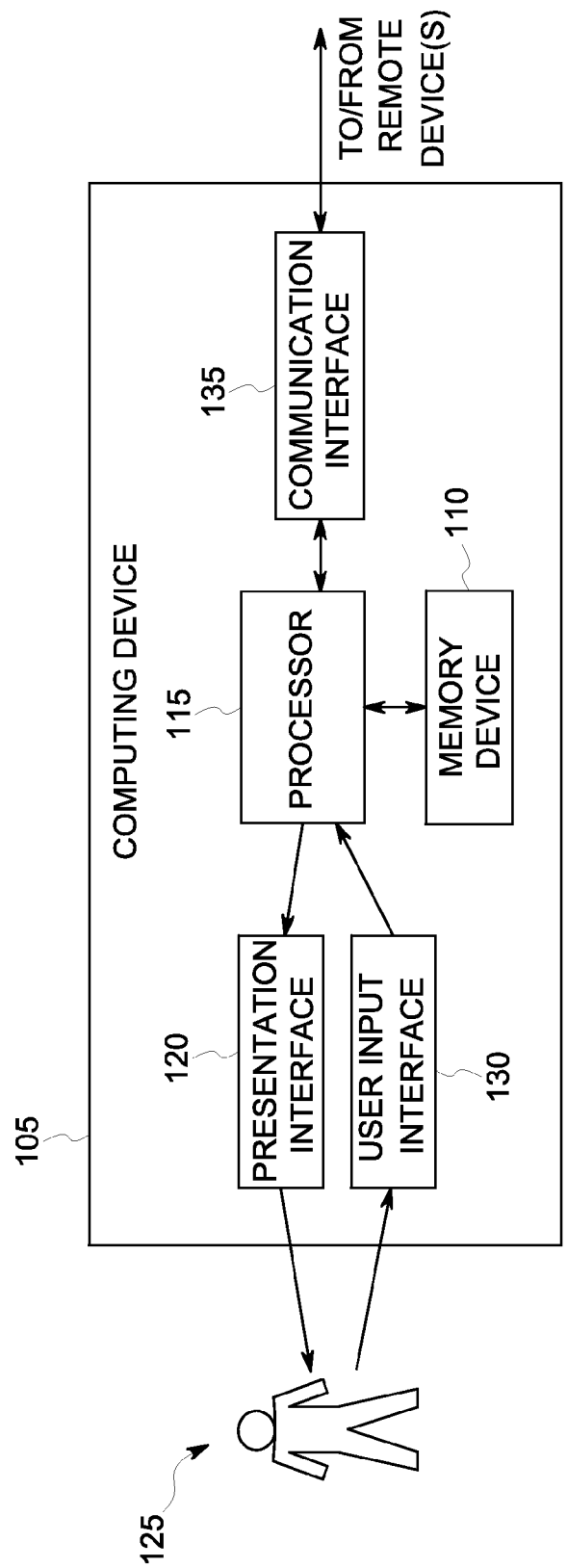
FIG. 1 is a block diagram of an exemplary computing device.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "black start" refers to providing electric power to at least one power generation facility in a geographically-isolated location from a source external to the power generation facility. A black start condition is considered to exist when there are no electric power generators in service in the power generation facility and there are no other sources of electric power in the geographically-isolated power generation facility to facilitate a restart of at least one electric power generator therein.

The HVDC converter systems for HVDC transmission of electric power described herein provide a cost-effective method for transmitting HVDC power in excess of 800 kilovolts (kV). The embodiments described herein use a capacitor commutated converter (CCC) rather than line commutated converters (LCCs) for conversion of AC power to HVDC power. In addition to the CCCs, the embodiments described herein use a self-commutated converter (SCC) coupled with the CCC to the AC side through a transformer and the SCC and CCC are connected in series on the DC side. The SCCs described herein include an AC-to-DC conversion stage (AC/DC stage) including capacitive sub-modules with variable energy storage features to facilitate regulating, i.e., shaping AC voltage, AC current, intermediate DC voltage, and intermediate DC current waveforms. Also, the embodiments described herein use a plurality of switching devices to further regulate the AC and DC waveforms. The plurality of switching devices regulate the charging of the capacitive sub-modules such that the associated in-rush current is regulated within predetermined current parameters, thereby decreasing a voltage stress induced on the components of the capacitive sub-modules and the related circuitry such that there is no need to use an additional pre-charging circuit. In at least one embodiment described herein, a DC-to-DC conversion stage (DC/DC stage) is coupled to the AC/DC stage such that a plurality of fast-acting switches in the DC/DC stage regulate operation as described above. In at least one other embodiment described herein, a plurality of switches with a low switching frequency, i.e., up to 6-12 switching operations per one AC cycle, in the AC/DC stage regulate operation as described above in cooperation with the switches in the DC/DC stage. In at least one additional embodiment described herein, a plurality of switches with a low switching frequency, i.e., up to 6-12 switching operations per one AC cycle, in the AC/DC stage regulate operation as described above without a DC/DC stage. In addition, the architectures described herein reduce reactive power consumption and generation of harmonics such that there is a decreased need for large AC filters, up to elimination, thereby decreasing the costs of installing, operating, and maintaining an AC filter portion of the switchyard that is capital-intensive due to the land required and the cost and size of large equipment installed. In addition, a significant investment in replacement parts and preventative and corrective maintenance activities that increases operational costs is reduced.

FIG. 1 is a block diagram of an exemplary computing device 105 that may be used to perform monitoring and/or control of a high voltage direct current (HVDC) transmission system and, more specifically, an electric power conversion system (neither shown in FIG. 1). More specifically, computing device 105 monitors and/or controls any piece of equipment, any system, and any process associated with an electric power conversion system and a HVDC transmission system, e.g., without limitation, bidirectional power converters, mechanical isolation devices, and monitoring devices (neither shown in FIG. 1). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical voltage and current values, and/or any other type data. Also, memory device 110 includes, without limitation, sufficient data, algorithms, and commands to facilitate monitoring and control of the components within a HVDC transmission system and an associated electric power conversion system.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the HVDC transmission system and associated electric power conversion system being monitored, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105.

Figure 2:
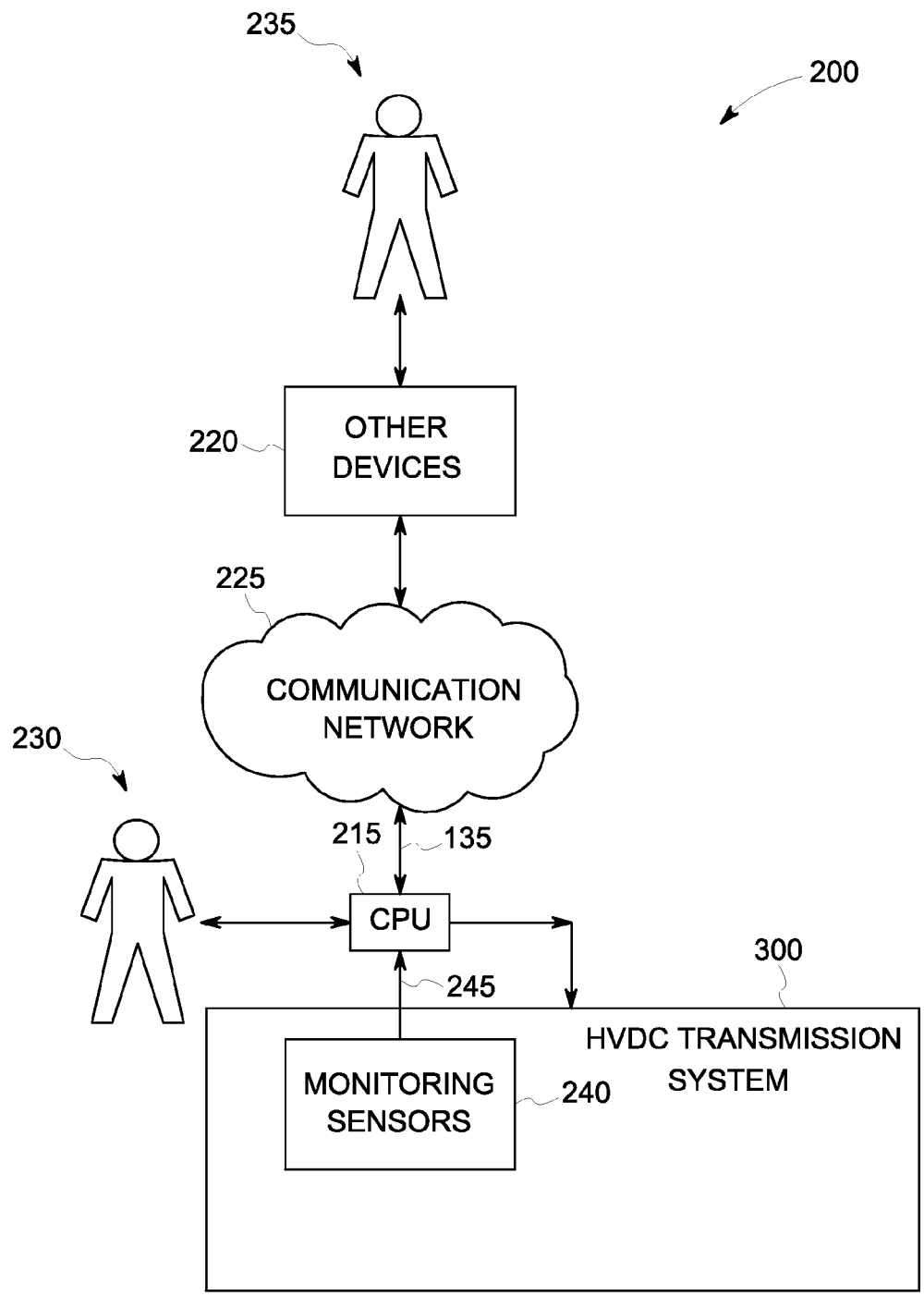
FIG. 2 is block diagram of a portion of an exemplary monitoring and control system that may include the computing device shown in FIG. 1.

FIG. 2 is block diagram of a portion of a monitoring and control system that may be used to monitor and control at least a portion of an associated HVDC transmission system 300 and associated HVDC converter systems (not shown in FIG. 2), i.e., in the exemplary embodiment, a Supervisory Control and Data Acquisition (SCADA) system 200. As used herein, the term "SCADA system" refers to any control and monitoring system that may monitor and control HVDC transmission system 300 across multiple sites, remote sites, and large distances. In some embodiments, SCADA system 200 may be a portion of a larger electrical management system (EMS). In the exemplary embodiment, SCADA system 200 includes at least one central processing unit (CPU) 215 configured to execute monitoring algorithms and monitoring logic. CPU 215 may be coupled to other devices 220 via a communication network 225.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about electric power conversion system 300, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining electric power conversion system 300, including, without limitation, shift operations personnel, maintenance technicians, and facility supervisors.

In the exemplary embodiment, HVDC transmission system 300 includes one or more monitoring sensors 240 coupled to CPU 215 through at least one input channel 245. Monitoring sensors 240 collect operational measurements including, without limitation, AC and DC voltages and currents generated within and transmitted through HVDC transmission system 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown). In alternative embodiments, CPU 215 includes, without limitation, sufficient data, algorithms, and commands to facilitate control of the DC current transmission through HVDC transmission system 300.

Figure 3:
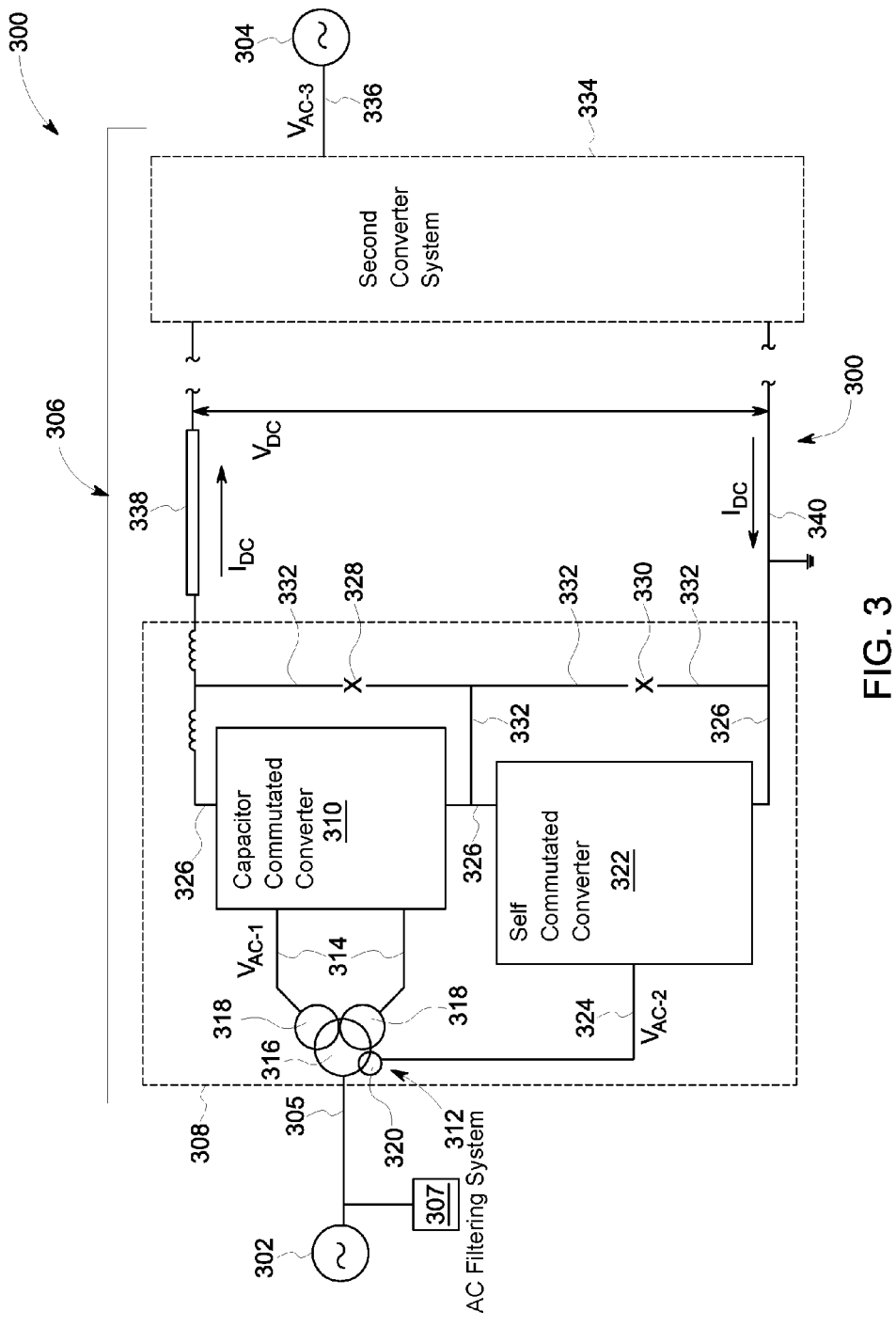
FIG. 3 is a schematic view of an exemplary high voltage direct current (HVDC) transmission system.

FIG. 3 is a schematic view of an exemplary high voltage direct current (HVDC) transmission system 300. HVDC transmission system 300 couples an alternating current (AC) electric power source 302 to an AC electric power transmission and distribution grid 304. Alternative embodiments include source 302 and grid 304 being interchangeable. For the embodiments described herein, three-phase AC systems are shown with only one conduit for clarity. HVDC transmission system 300 includes a separated power conversion configuration 306. AC electric power source 302 is coupled to separated power conversion configuration 306 though at least one AC conduit 305 that includes an AC filtering system 307. Separated power conversion configuration 306 includes a first converter system 308 that includes a capacitor commutated converter (CCC) 310. CCC 310 is coupled to AC electric power source 302 through a transformer 312 and a plurality of AC conduits 314. In the exemplary embodiment, transformer 312 includes primary windings 316, secondary windings 318 inductively coupled to primary windings 316, and tertiary windings 320 inductively coupled to primary windings 316. Alternatively, any configuration of transformer 312, including, without limitation, multiple transformers, that enable operation of first converter system 308 is used. Conduits 314 are energized to a voltage of $V_{AC-1}$ through secondary windings 318.

First converter system 308 further includes a self-commutated converter (SCC) 322 coupled in parallel with CCC 310 through a plurality of AC conduits 324 and tertiary windings 320. Conduits 324 are energized to a voltage of $V_{AC-2}$. SCC 322 and CCC 310 are coupled in series through a plurality of DC conduits 326. First converter system 308 also includes a CCC bypass switch 328, a SCC bypass switch 330, and a plurality of DC bypass conduits 332. Switches 328 and 330 and conduits 332 at least partially define a black start path (discussed further below). In the exemplary embodiment, switch devices 328 and 330 are normally open and are manually and locally operated to close to bypass CCC 310 and SCC 322, respectively Alternatively, switch devices 328 and 330 may be operated remotely.

Separated power conversion configuration 306 also includes a second converter system 334 coupled to AC electric power transmission and distribution grid 304 through a plurality of AC conduits 336. Conduits 336 are energized to a voltage of $V_{AC-3}$. Second converter system 334 is also coupled to first converter system 308 through a plurality of HVDC transmission conduits 338 and 340. In the exemplary embodiment, HVDC transmission system 300 includes a uni-polar configuration and conduit 338 is maintained at a positive voltage potential and conduit 340 is maintained at a substantially neutral, or ground potential. Alternatively, HVDC transmission system 300 may have a bi-polar configuration, i.e., conduit 338 is energized with a positive polarity and conduit 340 is energized with a negative polarity. In the exemplary embodiment, first converter system 308 and second converter system 334 are substantially identical. Alternatively, first converter system 308 and second converter system 334 are different.

In operation, first converter system 308 receives three-phase, sinusoidal, alternating current (AC) power from AC electric power source 302 and rectifies the three-phase, sinusoidal, AC power to DC power with a current $I_{DC}$ at a predetermined voltage $V_{DC}$ that is transmitted across conduits 338 and 340. Second converter system 334 receives $I_{DC}$ and converts the DC power to three-phase, sinusoidal, AC power with pre-determined voltages, currents, and frequencies. The combination of SCC 322 and CCC 310 regulates the DC voltage ($V_{DC}$) on the DC-side of first converter system 308 within established parameters.

Figure 4:
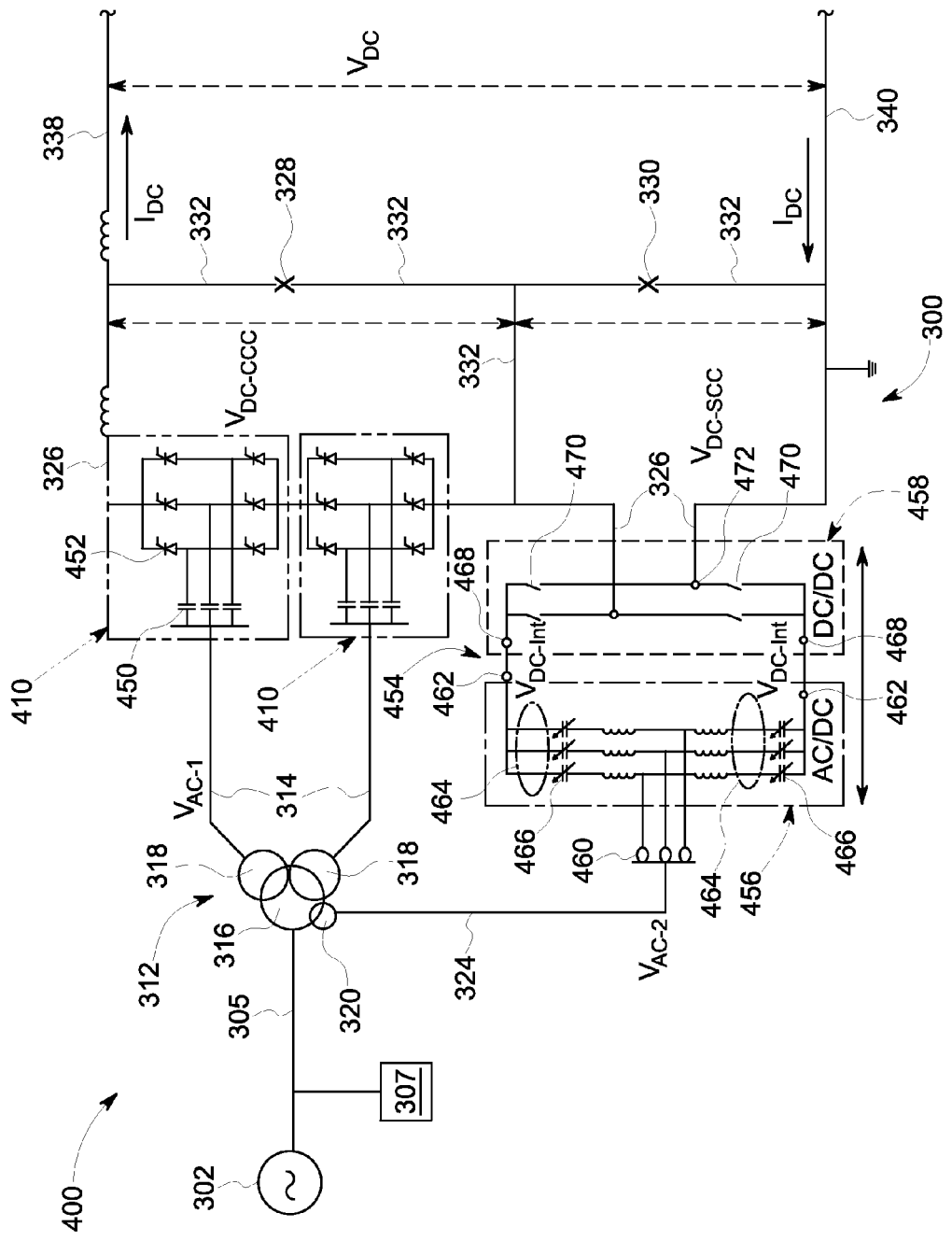
FIG. 4 is a schematic view of an exemplary high voltage direct current (HVDC) converter system that may be used with the HVDC transmission system shown in FIG. 3.

FIG. 4 is a schematic view of an exemplary high voltage direct current (HVDC) converter system 400 that may be used with HVDC transmission system 300 as first converter system 308 (shown in FIG. 3). In the exemplary embodiment, HVDC converter system 400 includes at least one externally, i.e., capacitor commutated converter (CCC) 410 (two shown in FIG. 4) as CCC 310 (shown in FIG. 3). CCC 410 includes a plurality of fixed capacitors 450 coupled to a plurality of semiconductor power devices, e.g., and without exception, thyristors 452. Each CCC 410 converts AC voltages and AC currents to a DC voltage, i.e., $V_{DC\text{-}CCC}$ and DC current. Fixed capacitors 450 facilitate commutation of thyristors 452.

HVDC converter system 400 also includes at least one self-commutated converter (SCC) 454 (only one shown in FIG. 4) as SCC 322 (shown in FIG. 3). SCC 454 is bidirectional. In the exemplary embodiment, SCC 454 includes at least one AC/DC stage 456 and at least one DC/DC stage 458 coupled in series with each other (only one of each shown).

AC/DC stage 456 includes a plurality of AC terminals 460 and is coupled to AC conduit 324 through AC terminals 460. AC/DC stage 456 is coupled in parallel with CCCs 410 through AC terminals 460, AC conduits 324, and tertiary windings 320. AC/DC stage 456 also includes a plurality of DC terminals 462 and is coupled to DC/DC stage 458 through DC terminals 462. AC/DC stage 456 further includes a plurality of branched conduits 464 extending from AC terminals 460 to DC terminals 462. Each branched conduit 464 includes a plurality, i.e., a set of capacitive sub-modules 466 shown as a capacitive device with an arrow extending therethrough. As such, each set of capacitive sub-modules 466 includes a plurality of individual capacitive sub-modules (not shown in FIG. 4, and discussed further below), and each individual capacitive sub-module within each set 466 is configured to be selectably placed in service, thereby facilitating operating each set of capacitive sub-modules 466 as a variable capacitive device.

DC/DC stage 458 includes a plurality of DC terminals 468 that couples DC/DC stage 458 to AC/DC stage 456 through DC terminals 462. DC/DC stage 458 also includes a plurality of fast-acting semiconductor switches 470, e.g., and without exception, insulated gate bipolar transistors (IGBTs) and thyristors. Alternatively, any switching devices that enable operation of DC/DC stage 470 as described herein are used, including, without limitation, mercury tubes. DC/DC stage 458 further includes a plurality of DC terminals 472 and is coupled to DC conduits 326 through DC terminals 472, and is therefore coupled in series with CCCs 410 through DC conduits 326. SCC 454 converts AC voltages and AC currents to a DC voltage, i.e., $V_{DC\text{-}SCC}$ and DC current.

In operation, CCCs 410 receive three-phase, sinusoidal, AC power from AC electric power source 302 through primary windings 316 and secondary windings 318 of transformer 312 and AC conduits 314 at voltage $V_{AC\text{-}1}$. CCCs 410 rectify the AC voltage to a HVDC voltage, i.e., $V_{DC\text{-}CCC}$.

Also, in operation, AC/DC stage 456 of SCC 454 receives three-phase, sinusoidal, AC power from AC electric power source 302 through primary windings 316 and tertiary windings 320 of transformer 312 and AC conduits 324 at voltage $V_{AC\text{-}2}$. AC/DC stage 456 rectifies the AC voltage and current to an intermediate DC voltage $V_{DC\text{-}Int}$ and intermediate current value that are transmitted to DC/DC stage 458 through DC terminals 462 and 468. DC/DC stage 458 modulates, e.g., through pulse width modulation (PWM) the intermediate DC voltage $V_{DC\text{-}Int}$ to an HVDC voltage value, i.e., $V_{DC\text{-}SCC}$, with a commensurate HVDC current value, that is summed with $V_{DC\text{-}CCC}$ to induce $V_{DC}$. The combination of SCC 454 and CCCs 410 regulates the $V_{DC}$ and $I_{DC}$ on HVDC transmission conduits 338 and 340 within established parameters. In the exemplary embodiment, $V_{DC}$ is in excess of 800 kilovolts (kV).

SCC 454 as described herein uses AC/DC stage 456 including capacitive sub-modules 466 with variable energy storage features to facilitate regulating, i.e., shaping AC voltage, AC current, intermediate DC voltage, and intermediate DC current waveforms. Also, SCC 454 uses DC/DC stage 458, including fast-acting semiconductor switches 470, to regulate the charging of capacitive sub-modules 466 such that the associated in-rush current is regulated within predetermined current parameters, thereby decreasing a voltage stress induced on the components of capacitive sub-modules 466 and the related circuitry such that there is no need to use an additional pre-charging circuit. Under some circumstances, i.e., when SCC 454 has a reversed current flow, i.e., DC-to-AC, e.g., during black start operation, DC/DC stage 458 uses fast-acting semiconductor switches 470 to facilitate regulating, i.e., shaping intermediate DC voltage and intermediate DC current waveforms.

Also, in operation, DC/DC stage 458 may be placed in a bypass mode through closing SCC bypass switch 330 and opening switches 470 such that CCCs 410 are coupled to HVDC transmission conduit 340 through closed bypass switch 330 and AC/DC stage 456 is isolated from HVDC conduits 338 and 340 and the associated DC voltage transients and DC current transients thereon. Further, in operation, capacitive sub-modules 466 may be operated to regulate the AC-to-DC conversion such that AC/DC stage 456 facilitates decoupling DC/DC stage 458 from AC transients upstream of AC terminals 460.

FIG. 5 is a schematic view of a plurality of, i.e., exemplary set of capacitive sub-modules 466 that may be used with HVDC converter system 400 (shown in FIG. 4). In the exemplary embodiment, set of capacitive sub-modules 466 is positioned between two terminals 474 and 476. Also, in the exemplary embodiment, set 466 includes capacitive sub-modules 478 coupled together in a series configuration. Alternatively, any electrical configuration of capacitive sub-modules 478 that enables operation of HVDC converter system 400 as described herein is used. Each capacitive sub-module 478 is discussed further below.

FIG. 6 is a schematic view of an exemplary capacitive sub-module 500 that may be used with set of capacitive sub-modules 466 and that may be used as capacitive sub-module 478 (both shown in FIG. 5). In the exemplary embodiment, capacitive sub-module 500 includes a plurality of semiconductor switching devices 502 and 504, e.g., and without limitation, IGBTs. Also, capacitive sub-module 500 includes at least one energy storage element, e.g., and without limitation, a capacitor 506 coupled to semiconductor switching devices 502 and 504.

In typical operation, semiconductor switching devices 502 and 504 shift between an ON state and an OFF state to regulate capacitor 506. As such, operation of semiconductor switching devices 502 and 504 regulates current flow through devices 502 and 504 and capacitor 506 and, therefore, current flow through capacitive sub-module 500. Also, operation of semiconductor switching devices 502 and 504 regulates a voltage state, or level of capacitor 506 and, therefore, capacitive sub-module 500. A plurality of capacitive sub-modules 500 is positioned within set of capacitive sub-modules 466 and operation of switching devices 502 and 504 in each sub-module 500 regulates current and voltage throughout set of capacitive sub-modules 466, and therefore regulate AC voltage, AC current at conduit 460 and intermediate DC voltage and current at terminals 462.

FIG. 7 is a schematic view of an alternative capacitive sub-module 510 that may be used with set of capacitive sub-modules 466 and that may be used as capacitive sub-module 478 (both shown in FIG. 5). In the exemplary embodiment, capacitive sub-module 510 includes a plurality of semiconductor switching devices 512, 514, 516, and 518, e.g., and without limitation, IGBTs. Also, capacitive sub-module 510 includes at least one energy storage element, e.g., and without limitation, a capacitor 520 coupled to semiconductor switching devices 512, 514, 516, and 518.

In typical operation, semiconductor switching devices 512, 514, 516, and 518 shift between an ON state and an OFF state to regulate capacitor 520. As such, operation of semiconductor switching devices 512, 514, 516, and 518 regulates current flow through devices 512, 514, 516, and 518 and capacitor 520, and therefore, current flow through capacitive sub-module 510. Also, operation of semiconductor switching devices 512, 514, 516, and 518 regulates a voltage state, or level of capacitor 520 and, therefore, capacitive sub-module 510. A plurality of capacitive sub-modules 510 is positioned within set of capacitive sub-modules 466, and operation of switching devices 512, 514, 516, and 518 in each sub-module 510 regulates current and voltage throughout set of capacitive sub-modules 466, and therefore regulates AC voltage, AC current at conduit 460 and the intermediate DC voltage and current at terminals 462.

For example, and without limitation, if semiconductor switching devices 512 and 518 are in an ON state and switching device 514 and 516 are in an OFF state, capacitor 520 is effectively bypassed. For those circumstances when semiconductor switching devices 512 and 516 are in an ON state, and semiconductor switching devices 514 and 518 are in an OFF state, capacitor 520 is effectively bypassed. Similarly, For those circumstances when semiconductor switching devices 512 and 516 are in an OFF state, and semiconductor switching devices 514 and 518 are in an ON state, capacitor 520 is effectively bypassed. For those circumstances when semiconductor switching devices 512 and 518 are in an OFF state and semiconductor switching devices 514 and 516 are in an ON state, a polarity of capacitor 520 is induced such that current is transmitted through switching devices 514 and 516 and capacitor 520. Alternatively, for those circumstances when semiconductor switching devices 514 and 516 are in an OFF state and semiconductor switching devices 512 and 518 are in an ON state, a polarity of capacitor 520 is induced such that current is transmitted through switching devices 512 and 518 and capacitor 520.

Figure 8:
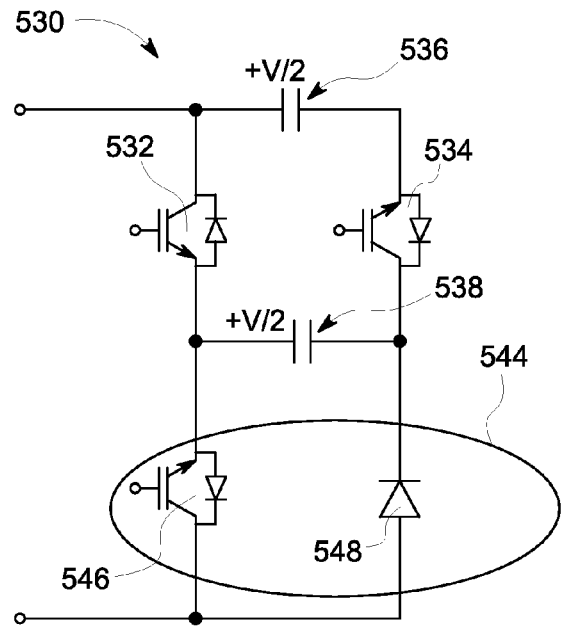
FIG. 8 is a schematic view of another alternative capacitive sub-module that may be used with the set of capacitive sub-modules shown in FIG. 5.

FIG. 8 is a schematic view of another alternative capacitive sub-module 530 that may be used with set of capacitive sub-modules 466 and that may be used as capacitive sub-module 478 (both shown in FIG. 5). In the exemplary embodiment, capacitive sub-module 530 includes a plurality of semiconductor switching devices 532 and 534, e.g., and without limitation, insulated gate bipolar transistors (IGBTs). Capacitive sub-module 530 also includes two energy storage elements, e.g., and without limitation, capacitors 536 and 538 as two capacitive segments 536 and 538 coupled to semiconductor switching devices 532 and 534. Capacitive sub-module 530 further includes a fault module 544 that includes a semiconductor switching device 546, e.g., an IGBT and a diode 548.

In typical operation, semiconductor switching devices 532 and 534 shift between an ON state and an OFF state to regulate a state of capacitive segments 536 and 538. Also, switching device 546 is normally on and diode 548 allows current only in one direction, i.e., towards capacitor 538 and switch 534. As such, operation of semiconductor switching devices 532 and 534 regulates current flow and a voltage state through capacitive sub-module 530. Therefore, a plurality of capacitive sub-modules 530 is positioned within set of capacitive sub-modules 466 and regulates current and voltage throughout set of capacitive sub-modules 466, and therefore regulates AC voltage and AC current at conduit 460 and intermediate DC voltage and current at terminals 462.

In the event of a severe transient and/or a fault on a portion of HVDC transmission system 300, e.g., and without limitation, HVDC transmission conduits 538 and 540, switching device 546 switches to an OFF state, one of capacitive segments 540 and 542 of capacitors 536 and 538 attain a reversed voltage polarity to current flow, and diode 548 prevents current flow out of capacitive sub-module 530, Therefore, overall current flow through capacitive sub-module 530 is significantly decreased during fault conditions.

Figure 9:
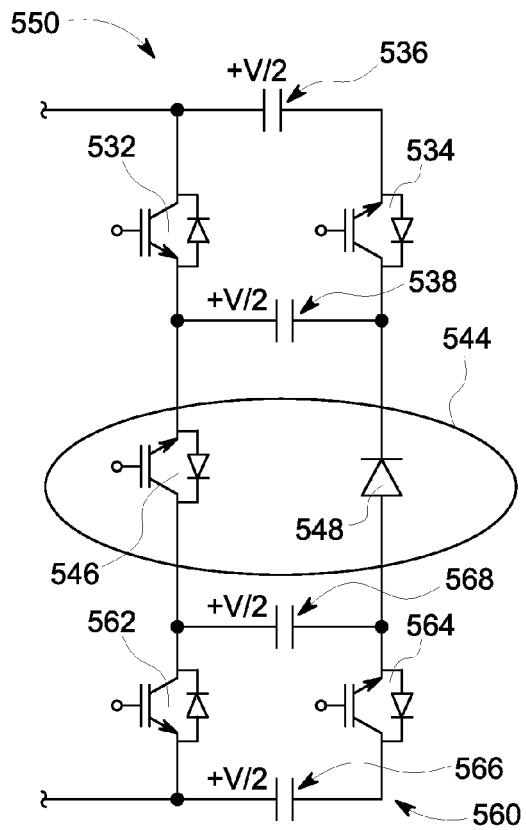
FIG. 9 is a schematic view of a plurality of the capacitive sub-modules shown in FIG. 8.

FIG. 9 is a schematic view of a plurality of capacitive sub-modules 550 and 560 similar to capacitive sub-module 530 (shown in FIG. 8) that shares a fault module 544. Specifically, capacitive sub-modules 550 and 560 are configured with fault module 544 such that at least two of four semiconductor switching devices are shared between adjacent capacitive sub-modules. Capacitive sub-module 550 includes similar numbering of components as capacitive sub-module 530 (shown in FIG. 8). In contrast, capacitive sub-module 560 includes semiconductor switching devices 562 and 564 and capacitors, i.e., capacitive segments 566 and 568 in a similar configuration as sub-module 550. In the exemplary embodiment, capacitive sub-module 550 shares switching devices 546 and 548 with capacitive sub-module 560. Operation of capacitive sub-modules 550 and 560 is similar to that described for capacitive sub-module 530 above.

Figure 10:
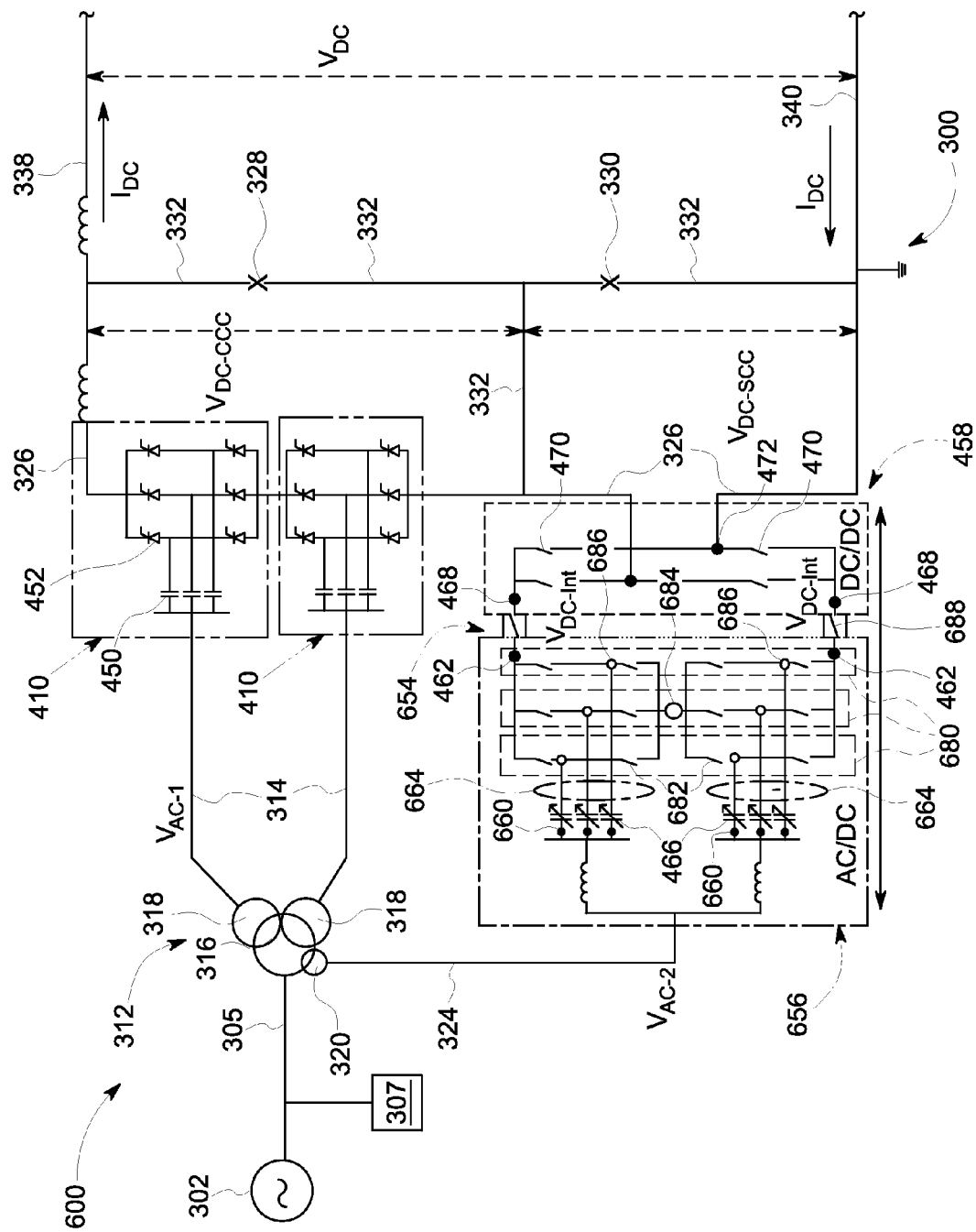
FIG. 10 is a schematic view of an alternative HVDC converter system that may be used with the HVDC transmission system shown in FIG. 3.

FIG. 10 is a schematic view of an alternative HVDC converter system 600 that may be used with HVDC transmission system 300. HVDC converter system 600 is similar to HVDC converter system 400 (shown in FIG. 4) with the exceptions discussed below.

HVDC converter system 600 includes at least one self-commutated converter (SCC) 654 (only one shown in FIG. 11) as SCC 322 (shown in FIG. 3). SCC 654 is bidirectional. In the exemplary embodiment, SCC 654 includes at least one AC/DC stage 656 and at least one DC/DC stage 458 coupled in series with each other (only one of each shown). SCC 654 converts AC voltages and AC currents to a DC voltage, i.e., $V_{DC\text{-}SCC}$ and DC current.

AC/DC stage 656 includes a plurality of AC terminals 660 and is coupled to AC conduit 324 through AC terminals 660. AC/DC stage 656 is coupled in parallel with CCCs 410 through AC terminals 660, AC conduits 324, and tertiary windings 320. AC/DC stage 656 also includes plurality of DC terminals 462 and is coupled to DC/DC stage 458 through DC terminals 462. AC/DC stage 656 further includes a plurality of branched conduits 664 extending from AC terminals 460 to DC terminals 462. Each branched conduit 664 includes set of capacitive sub-modules 466.

AC/DC stage 656 also includes a plurality of switching power poles 680 (three shown) coupled to AC terminals 460 through branched conduits 664 and further coupled to DC terminals 462. Each switching power pole 680 includes a plurality of switching devices 682 coupled in series (two devices 682 per pole 680 shown). A coupling terminal 684 is defined by switching power poles 680 such that all of switching power poles 680 are coupled thereto. In the exemplary embodiment, each switching device 682 is a low-frequency switch device configured to cycle between an on-condition and an off-condition at a frequency up to six times per AC line cycle to twelve times per AC line cycle. Alternatively, any cycle frequency that enables operation of switching power poles 680 as described herein is used.

Further, in the exemplary embodiment, each branched conduit 664 and each switching pole 680 between switching devices 682 define a floating terminal 686 therebetween. Each capacitive sub-module 478 (shown in FIG. 5) of capacitive sub-modules 466 is positioned between each associated floating terminal 686 and associated AC terminal 460.

DC/DC stage 458 is described above. HVDC converter system 600 also includes a plurality of DC disconnect switches 688 coupled between DC terminals 462 and 468, thereby facilitating isolation of AC/DC stage 656 from DC/DC stage 458 and the DC components downstream.

In operation, CCCs 410 rectify AC voltage $V_{AC\text{-}1}$ to a HVDC voltage, i.e., $V_{DC\text{-}CCC}$, as described above. Also, in operation, AC/DC stage 656 of SCC 654 receives three-phase, sinusoidal, AC power from AC electric power source 302 through primary windings 316 and tertiary windings 320 of transformer 312 and AC conduits 324 at voltage $V_{AC\text{-}2}$. AC/DC stage 656 rectifies the AC voltage and current to an intermediate DC voltage $V_{DC\text{-}Int}$ and intermediate current value that are transmitted to DC/DC stage 458 through DC terminals 462 and 468 and DC disconnect switches 688. DC/DC stage 458 modulate the intermediate DC voltage $V_{DC\text{-}Int}$ to an HVDC voltage value, i.e., $V_{DC\text{-}SCC}$, with a commensurate HVDC current value, that is summed with $V_{DC\text{-}CCC}$ to induce $V_{DC}$. The combination of SCC 654 and CCCs 410 regulates the $V_{CC}$ and $I_{DC}$ on HVDC transmission conduits 338 and 340 within established parameters. In the exemplary embodiment, $V_{DC}$ is in excess of 800 kV.

SCC 654 as described herein uses AC/DC stage 656 including capacitive sub-modules 466 with variable energy storage features to facilitate regulating, i.e., shaping AC voltage, AC current, intermediate DC voltage, and intermediate DC current waveforms. Also, SCC 654 uses DC/DC stage 458, including fast-acting semiconductor switches 470, as well as low-frequency switching devices 682 in AC/DC stage 656 to regulate the charging of capacitive sub-modules 466 such that the associated in-rush current is regulated within predetermined current parameters, thereby decreasing a voltage stress induced on the components of capacitive sub-modules 466 and the related circuitry such that there is no need to use an additional pre-charging circuit. In addition, the voltage stresses on capacitive sub-modules 466 is decreased by up to 30% to 50% of that associated with HVDC converter system 400 (shown in FIG. 4). Under some circumstances, i.e., when SCC 654 has a reversed current flow, i.e., DC-to-AC, DC/DC stage 458 uses fast-acting semiconductor switches 470 to facilitate regulating, i.e., shaping intermediate DC voltage and intermediate DC current waveforms.

Also, in operation, DC/DC stage 458 may be placed in a bypass mode through closing SCC bypass switch 330 and opening switches 470 such that CCCs 410 are coupled to HVDC transmission conduit 340 through closed bypass switch 330 and AC/DC stage 656 is isolated from HVDC conduits 338 and 340 and the associated DC voltage transients and DC current transients thereon. Further, in operation, in the event that DC/DC stage 458 must be fully removed from service and isolated, DC disconnect switches 688 are opened and AC/DC stage 656 may be operated as an AC filtering unit and/or a STATCOM. Moreover, in operation, capacitive sub-modules 466 may be operated to regulate the AC-to-DC conversion such that AC/DC stage 656 facilitates decoupling DC/DC stage 458 from AC transients upstream of AC terminals 660.

Figure 11:
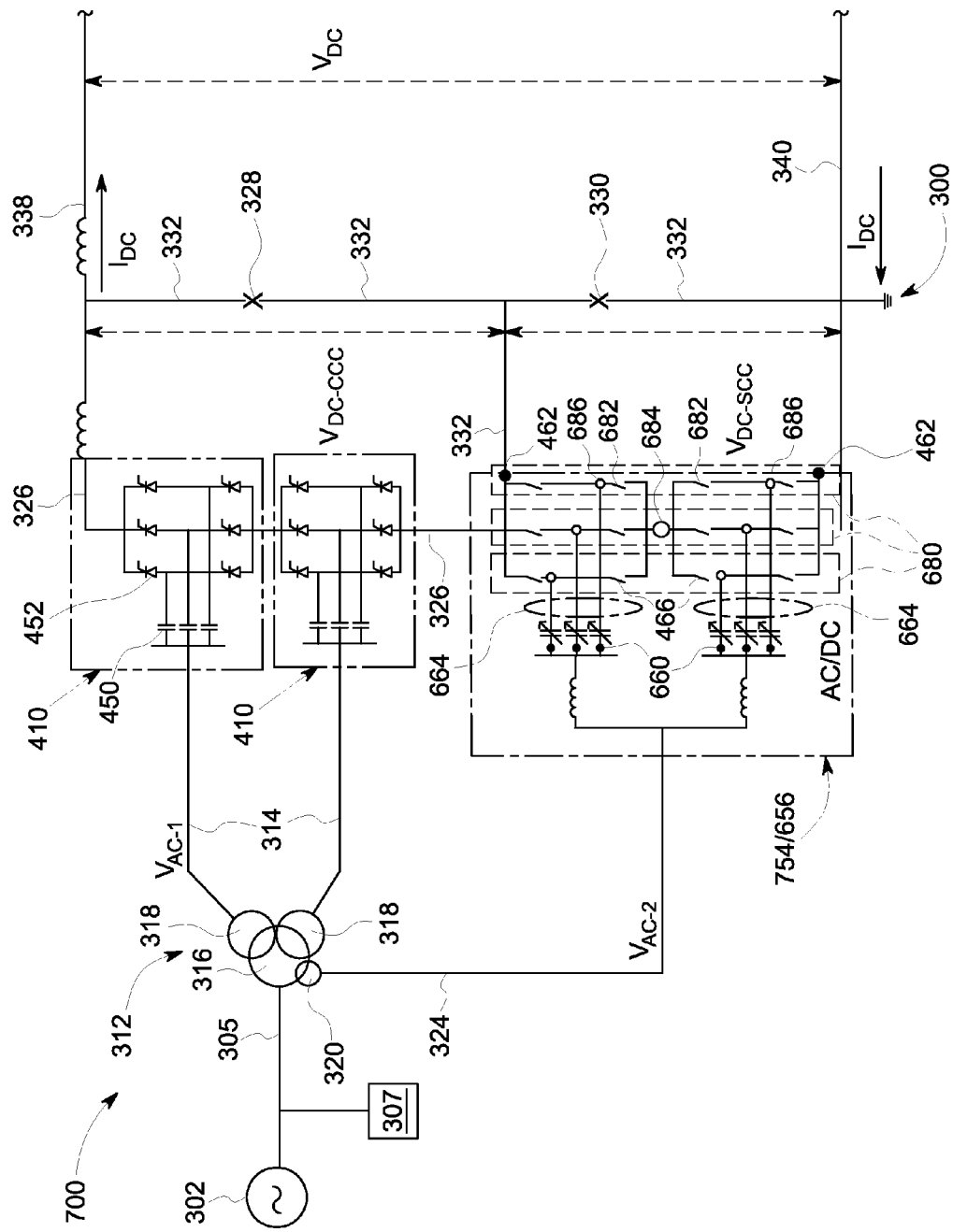
FIG. 11 is a schematic view of another alternative HVDC converter system that may be used with the HVDC transmission system shown in FIG. 3.

FIG. 11 is a schematic view of another alternative HVDC converter system 700 that may be used with HVDC transmission system 300. HVDC converter system 700 is similar to HVDC converter system 600 (shown in FIG. 11) with the exceptions discussed below.

HVDC converter system 700 includes an SCC 754 that only includes AC/DC stage 656 and does not include DC/DC stage 458. Therefore, AC/DC stage 656 is configured to generate HVDC voltages $V_{DC\text{-}SCC}$ such that when added to $V_{DC\text{-}CCC}$ induces a voltage $V_{AC}$ in excess of 800 kV. Opening all of switches 682 in switching power poles 680 and closing SCC bypass switch 330 bypasses most of SCC 754 while CCCs 410 may remain in operation.

Figure 12:
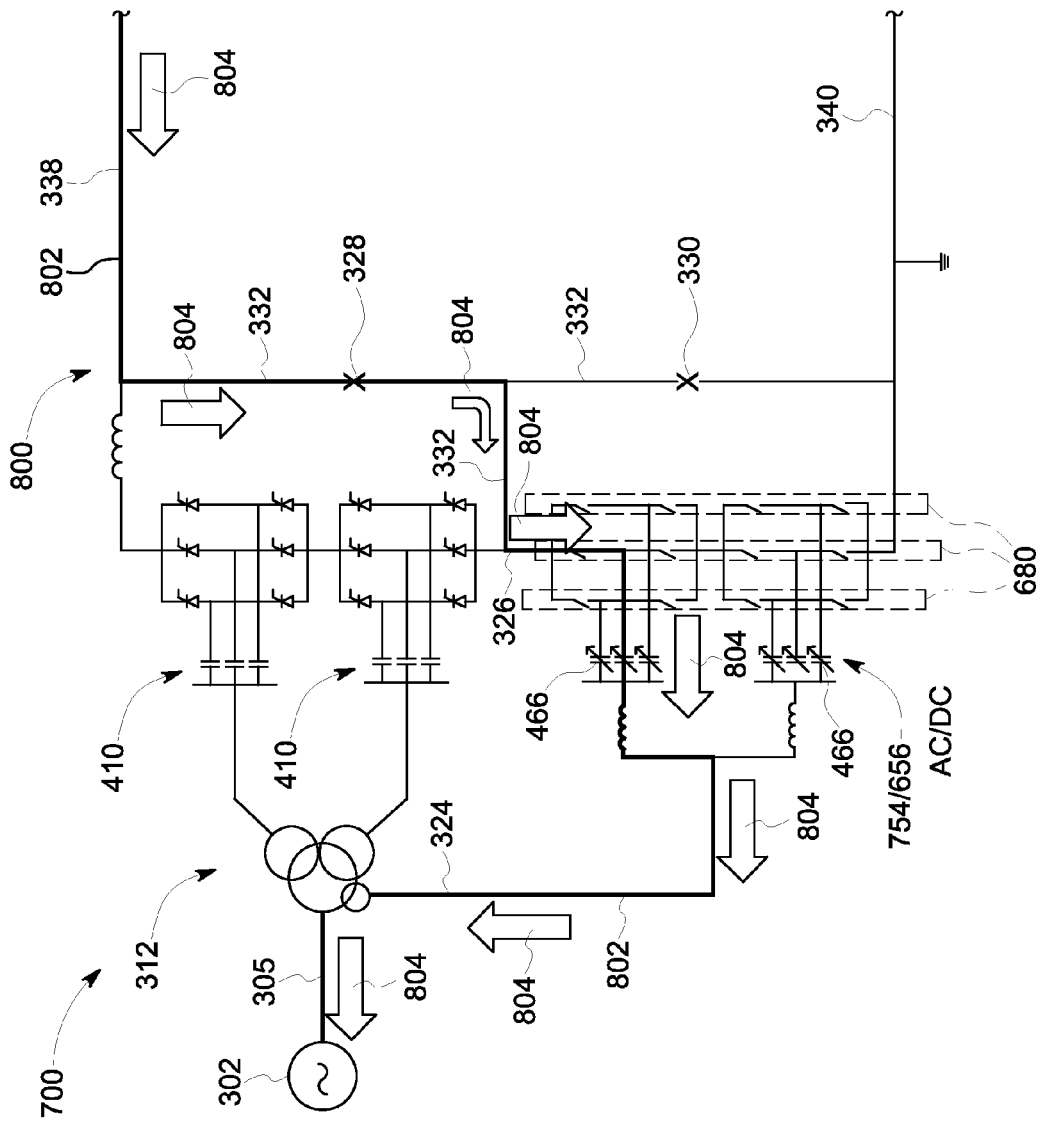
FIG. 12 is a schematic view of an exemplary black start configuration that may be used with the HVDC converter system shown in FIG. 3.

FIG. 12 is a schematic view of an exemplary black start configuration 800 that may be used with HVDC converter system 700. Similar configurations may be used with HVDC converter systems 400 and 600 (shown in FIGS. 4 and 11, respectively). Black start configuration 800 is at least partially implemented in SCADA system 200 (shown in FIG. 2).

Also, in the exemplary embodiment, a black start flow path 802 is defined from AC grid 304 through second converter system 334 (shown in FIG. 3), HVDC transmission conduit 338, CCC bypass switch 328, SCC 754 (AC/DC stage 656), to AC source 302. As such, SCC 754 is bidirectional. For example, for those periods when no electric power generators are in service within AC source 302, electric power is transmitted from AC grid 304 through system 300 to AC source 302 to power loads thereon. Based on the direction of power flow, either of second converter system 334 or SCC 754 controls the DC line current.

In black start operation, HVDC transmission system 300 starts with substantially most devices between HVDC transmission conduit 338 and AC source 302 substantially deenergized. Transformer 312 is electrically isolated from CCCs 410. CCC bypass switch 328 is closed, either locally or remotely, thereby defining a portion of path 802 that bypasses CCCs 410, and directly coupling SCC 754 with HVDC transmission conduit 338. Also, in black start operation, capacitive sub-modules 466 of SCC 754 are charged which in turn energizes AC conduits 324. SCC 754 generates sufficient AC power to at least partially energize AC conduits 324 and transmit AC power to AC source 302 through regulation of capacitive sub-modules 466. Power flow through black start configuration 800 is indicated by arrows 804.

The above described HVDC converter systems for HVDC transmission of electric power described herein provide a cost-effective method for transmitting HVDC power in excess of 800 kilovolts (kV). The embodiments described herein use a capacitor commutated converter (CCC) rather than line commutated converters (LCCs) for conversion of AC power to HVDC power. In addition to the CCCs, the embodiments described herein use a self-commutated converter (SCC) coupled in parallel with the CCC on the AC side and in series with the CCC on the DC side. The SCCs described herein include an AC-to-DC conversion stage (AC/DC stage) including capacitive sub-modules with variable energy storage features to facilitate regulating, i.e., shaping AC voltage, AC current, intermediate DC voltage, and intermediate DC current waveforms. Also, the embodiments described herein use a plurality of switching devices to further regulate the AC and DC waveforms. The plurality of switching devices regulate the charging of the capacitive sub-modules such that the associated in-rush current is regulated within predetermined current parameters, thereby decreasing a voltage stress induced on the components of the capacitive sub-modules and the related circuitry such that there is no need to use an additional pre-charging circuit. In at least one embodiment described herein, a DC-to-DC conversion stage (DC/DC stage) is coupled to the AC/DC stage such that a plurality of fast-acting switches in the DC/DC stage regulate operation as described above. In at least one other embodiment described herein, a plurality of switches with a low switching frequency, i.e., up to 6-12 switching operations per one AC cycle, in the AC/DC stage regulate operation as described above in cooperation with the switches in the DC/DC stage. In at least one additional embodiment described herein, a plurality of switches with a low switching frequency, i.e., up to 6-12 switching operations per one AC cycle, in the AC/DC stage regulate operation as described above without a DC/DC stage.

An exemplary technical effect of the methods, systems, and apparatus described herein includes at least one of: (a) using capacitive sub-modules to regulate conversion of AC power to DC power and DC power to AC power; (b) using fast-acting switches and/or slow-acting switches to facilitate regulation of the capacitive sub-modules; (c) substantially decreasing a size of the capacitive sub-modules by reducing the voltage stresses induced thereon; (d) substantially decreasing a need for precharging circuits for the capacitive sub-modules; (e) operating a SCC with the associated DC/DC stage bypassed to isolate the associated AC/DC stage from DC-side transients and faults, thereby facilitating continued operation of the AC/DC stage; and (f) operating a SCC and regulating the associated capacitive sub-modules to reduce AC transient effects on the DC/DC stage.

Exemplary embodiments of electric power conversion systems for coupling power grids through a HVDC transmission system, and methods of operating such systems and devices are not limited to the specific embodiments described herein, but rather, components of systems and/or steps of the methods may be utilized independently and separately from other components and/or steps described herein. For example, the methods may also be used in combination with other systems requiring HVDC transmission and power conversion and the associated methods, and are not limited to practice with only the HVDC transmission systems and methods as described herein. Rather, the exemplary embodiment can be implemented and utilized in connection with many other DC transmission applications that are currently configured to transmit and receive electric power, e.g., and without limitation, DC distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hybrid high voltage direct current (HVDC) converter system comprising:
   at least one alternating current (AC) conduit;
   at least one transformer coupled to said at least one AC conduit;
   at least one direct current (DC) conduit;
   at least one capacitor commutated converter (CCC) configured to convert AC voltages and AC currents to a DC voltage and DC current, said at least one CCC coupled to said at least one AC conduit through said at least one transformer;
   at least one self-commutated converter (SCC) configured to convert AC voltages and AC currents to a regulated DC voltage and DC current, said at least one SCC comprising at least one AC/DC stage and at least one DC/DC stage coupled to said at least one AC/DC stage;

at least one CCC bypass switch coupled in parallel with said at least one CCC;

wherein the at least one AC/DC stage comprises a plurality of switching power poles coupled to plurality of AC terminals and plurality of DC terminals of the at least one AC/DC stage; and wherein each switching power pole of said plurality of switching power poles comprises a plurality of switching devices coupled in series, wherein said each switching power pole of said plurality of switching power poles defines and is coupled to a coupling terminal, said at least one AC/DC stage further comprises a plurality of branched conduits coupled to said plurality of switching power poles, each branched conduit of said plurality of branched conduits comprising a plurality of capacitive sub-modules, said plurality of branched conduits and said plurality of switching devices define a plurality of floating terminals therebetween, each capacitive sub-module of said plurality of capacitive sub-modules configured to be selectably placed in service between said plurality of floating terminals and said plurality of AC terminals, said at least one SCC coupled to said at least one CCC through said at least one transformer and said at least one AC conduit, and said at least one SCC and said at least one CCC coupled in series to said at least one DC conduit.

2. The hybrid HVDC converter system in accordance with claim 1, wherein said at least one AC/DC stage is coupled to said at least one CCC through said at least one transformer and said at least one AC conduit, and said at least one DC/DC stage and said at least one CCC are coupled in series to said at least one DC conduit.

3. The hybrid HVDC converter system in accordance with claim 1, wherein said at least one AC/DC stage comprises:
a plurality of AC terminals;
a plurality of DC terminals; and
a plurality of branched conduits extending between said plurality of AC terminals and said plurality of DC terminals, each branched conduit of said plurality of branched conduits comprising a plurality of capacitive sub-modules, each capacitive sub-module of said plurality of capacitive sub-modules configured to be selectably placed in service.

4. The hybrid HVDC converter system in accordance with claim 3, wherein each said capacitive sub-module comprises a plurality of semiconductor switching devices and a plurality of energy storage elements coupled to said plurality of semiconductor switching devices, said plurality of semiconductor switching devices configured to facilitate selectably placing at least one energy storage element of said plurality of energy storage elements in service.

5. The hybrid HVDC converter system in accordance with claim 4, wherein said plurality of energy storage elements comprises two capacitive segments, and said plurality of semiconductor switching devices comprises four semiconductor devices, wherein said two capacitive segments and said four semiconductor switching devices are configured such that turning-off at least a portion of said four semiconductor switching devices places one of said two capacitive segments in reverse voltage polarity to the current flow during fault conditions sensed in said plurality of DC terminals, thereby facilitating decreasing current flow therethrough.

6. The hybrid HVDC converter system in accordance with claim 5, wherein each said capacitive sub-module is configured such that at least two of said four semiconductor switching devices are shared between adjacent capacitive sub-modules.

7. The hybrid HVDC converter system in accordance with claim 3, wherein each said capacitive sub-module comprises a plurality of semiconductor switching devices and a plurality of energy storage elements coupled to said plurality of semiconductor switching devices, said plurality of semiconductor switching devices facilitates selectably placing at least one energy storage element of said plurality of energy storage elements in service, wherein said plurality of semiconductor switching devices are configured to facilitate regulation of:
at least one of an AC voltage and an AC current proximate said plurality of AC terminals; and
at least one of an intermediate DC voltage and an intermediate DC current proximate said plurality of DC terminals, wherein said at least one DC/DC stage is configured to facilitate regulation of at least one of a HVDC voltage and a HVDC current proximate said at least one DC conduit, and at least one of the intermediate DC voltage and the intermediate DC current proximate said plurality of DC terminals.

8. The hybrid HVDC converter system in accordance with claim 1, wherein said at least one SCC and said at least one CCC bypass switch at least partially define a black start current transmission path.

9. The hybrid HVDC converter system in accordance with claim 1, wherein said at least one SCC further comprises at least one DC/DC stage bypass switch coupled in parallel with said at least one DC/DC stage.

10. The hybrid HVDC converter system in accordance with claim 9, wherein said at least one DC/DC stage comprises a plurality of semiconductor switches, said plurality of semiconductor switches and said at least one DC/DC stage bypass switch facilitate placing said at least one DC/DC stage in a bypass mode, said at least one DC/DC stage configured to facilitate isolation of said at least one AC/DC stage from DC voltage transients and DC current transients.

11. A hybrid high voltage direct current (HVDC) converter system comprising:
at least one alternating current (AC) conduit;
at least one transformer coupled to said at least one AC conduit;
at least one direct current (DC) conduit;
at least one capacitor commutated converter (CCC) configured to convert AC voltages and AC currents to a DC voltage and DC current, said at least one CCC coupled to said at least one AC conduit through said at least one transformer; and
at least one self-commutated converter (SCC) configured to convert AC voltages and currents to a regulated DC voltage and DC current, said at least one SCC comprising:
at least one AC/DC stage comprising:
a plurality of AC terminals;
a plurality of DC terminals;
a plurality of switching power poles coupled to said plurality of AC terminals and coupled to said plurality of DC terminals;
at least one DC/DC stage coupled to said at least one AC/DC stage through said plurality of DC terminals;
wherein each switching power pole of said plurality of switching power poles comprises a plurality of switching devices coupled in series, wherein said each switching power pole of said plurality of switching power poles defines and is coupled to a coupling terminal, said at least one AC/DC stage further comprises a plurality of branched conduits coupled to said plurality of switching power poles, each branched conduit of said plurality of branched conduits comprising a plurality of capacitive sub-modules, said plurality of branched conduits and said plurality of switching devices define a plurality of floating terminals therebetween, each capacitive sub-module of said plurality of capacitive sub-modules configured to be selectably placed in service between said plurality of floating terminals and said plurality of AC terminals.

12. The hybrid HVDC converter system in accordance with claim 11, wherein said at least one AC/DC stage is coupled to said at least one CCC through said at least one transformer and said at least one AC conduit, and said at least one DC/DC stage and said at least one CCC are coupled in series to said at least one DC conduit.

13. The hybrid HVDC converter system in accordance with claim 11, wherein each said capacitive sub-module comprises a plurality of semiconductor switching devices and a plurality of energy storage elements coupled to said plurality of semiconductor switching devices, said plurality of semiconductor switching devices configured to facilitate selectably placing at least one of said plurality of energy storage elements in service.

14. The hybrid HVDC converter system in accordance with claim 13, wherein said plurality of energy storage elements comprises two capacitive segments, and said plurality of semiconductor switching devices comprises four semiconductor devices, wherein said two capacitive segments and said four semiconductor switching devices are configured such that turning-off at least a portion of said four semiconductor switching devices places one of said two capacitive segments in reverse voltage polarity to the current flow during fault conditions sensed in said plurality of DC terminals, thereby facilitating decreasing current flow therethrough.

15. The hybrid HVDC converter system in accordance with claim 14, wherein each said capacitive sub-module is configured such that at least two of said four semiconductor switching devices are shared between adjacent capacitive sub-modules.

16. The hybrid HVDC converter system in accordance with claim 11, wherein each said capacitive sub-module comprises a plurality of semiconductor switching devices and a plurality of energy storage elements coupled to said plurality of semiconductor switching devices, said plurality of semiconductor switching devices facilitates selectably placing at least one energy storage element of said plurality of energy storage elements in service, wherein said plurality of semiconductor switching devices and said plurality of switching power pole switching devices are configured to facilitate regulation of:
at least one of an AC voltage and an AC current proximate said plurality of AC terminals; and
at least one of an intermediate DC voltage and an intermediate DC current proximate said plurality of DC terminals, wherein said at least one DC/DC stage configured to facilitate regulation of at least one of a HVDC voltage and a HVDC current proximate said at least one DC conduit, and at least one of the intermediate DC voltage and the intermediate DC current proximate said plurality of DC terminals.

17. The hybrid HVDC converter system in accordance with claim 11, wherein each switching device of said plurality of switching devices of said plurality of switching power poles comprises a low-frequency switch device configured to cycle between an on-condition and an off-condition at a frequency within a range between approximately six times per AC line cycle and approximately twelve times per AC line cycle.

18. The hybrid HVDC converter system in accordance with claim 11 further comprising at least one CCC bypass switch coupled in parallel with said at least one CCC.

19. The hybrid HVDC converter system in accordance with claim 18, wherein said at least one SCC and said at least one CCC bypass switch at least partially define a black start current transmission path.

20. The hybrid HVDC converter system in accordance with claim 11, wherein said at least one SCC further comprises at least one DC/DC stage bypass switch coupled in parallel with said at least one DC/DC stage.

21. The hybrid HVDC converter system in accordance with claim 20, wherein said at least one DC/DC stage comprises a plurality of semiconductor switches, said plurality of semiconductor switches and said at least one DC/DC stage bypass switch facilitate placing said at least one DC/DC stage in a bypass mode, said at least one DC/DC stage configured to facilitate isolation of said at least one AC/DC stage from DC voltage transients and DC current transients.

22. A hybrid high voltage direct current (HVDC) converter system comprising:
at least one alternating current (AC) conduit;
at least one transformer coupled to said at least one AC conduit;
at least one direct current (DC) conduit;
at least one capacitor commutated converter (CCC) configured to convert AC voltages and AC currents to a DC voltage and DC current, said at least one CCC coupled to said at least one AC conduit through said at least one transformer;
at least one self-commutated converter (SCC) configured to convert AC voltages and AC currents to a regulated DC voltage and DC current, said at least one SCC comprising:
a plurality of AC terminals;
a plurality of DC terminals;
a plurality of switching power poles coupled to said plurality of AC terminals and coupled to said plurality of DC terminals; and
wherein each switching power pole of said plurality of switching power poles comprises a plurality of switching devices coupled in series, wherein said each switching power pole of said plurality of switching power poles defines and is coupled to a coupling terminal, said at least one AC/DC stage further comprises a plurality of branched conduits coupled to said plurality of switching power poles, each branched conduit of said plurality of branched conduits comprising a plurality of capacitive sub-modules, said plurality of branched conduits and said plurality of switching devices define a plurality of floating terminals therebetween, each capacitive sub-module of said plurality of capacitive sub-modules configured to be selectably placed in service between said plurality of floating terminals and said plurality of AC terminals, said at least one SCC coupled to said at least one CCC through said at least one transformer and said at least one AC conduit, and said at least one SCC and said at least one CCC coupled in series to said at least one DC conduit.

23. The hybrid HVDC converter system in accordance with claim 22 wherein said plurality of energy storage elements comprises two capacitive segments, and said plurality of semiconductor switching devices comprises four semiconductor devices, wherein said two capacitive segments and said four semiconductor switching devices are configured such that turning-off at least a portion of said four semiconductor switching devices places one of said two capacitive segments in reverse voltage polarity to the current flow during fault conditions sensed in said plurality of DC terminals, thereby facilitating decreasing current flow therethrough.

24. The hybrid HVDC converter system in accordance with claim 23, wherein each said plurality of capacitive sub-module is configured such that at least two of said four semiconductor switching devices are shared between adjacent capacitive sub-modules.

25. The hybrid HVDC converter system in accordance with claim 22, wherein each switching device of said plurality of switching devices of said plurality of switching power poles comprises a low-frequency switch device configured to cycle between an on-condition and an off-condition at a frequency within a range between approximately six times per AC line cycle and approximately twelve times per AC line cycle.

26. The hybrid HVDC converter system in accordance with claim 22, wherein each said capacitive sub-module comprises a plurality of semiconductor switching devices and a plurality of energy storage elements coupled to said plurality of semiconductor switching devices, said plurality of semiconductor switching devices configured to facilitate selectably placing at least one energy storage element of said plurality of energy storage elements in service, wherein said plurality of semiconductor switching devices and said plurality of switching power pole switching devices are configured to facilitate regulation of:
 at least one of an AC voltage and an AC current proximate said plurality of AC terminals; and
 at least one of a HVDC voltage and a HVDC current proximate said at least one DC conduit.

27. The hybrid HVDC converter system in accordance with claim 22 further comprising at least one CCC bypass switch coupled in parallel with said at least one CCC.

28. The hybrid HVDC converter system in accordance with claim 27, wherein said at least one SCC and said at least one CCC bypass switch at least partially define a black start current transmission path.

29. The hybrid HVDC converter system in accordance with claim 22 further comprising at least one SCC stage bypass switch in parallel with said at least one SCC.

* * * * *

UNITED STATES PATENT AND TRADEMARK OFFICE
CERTIFICATE OF CORRECTION

PATENT NO. : 9,515,565 B2
APPLICATION NO. : 14/200937
DATED : December 6, 2016
INVENTOR(S) : Gupta et al.

It is certified that error appears in the above-identified patent and that said Letters Patent is hereby corrected as shown below:

On Page 2, in Item (56), under "OTHER PUBLICATIONS", in Column 2, Line 26, delete "Univesity" and insert -- University --, therefor.

In Column 6, Line 32, delete "though" and insert -- through --, therefor.

In Column 8, Line 1, delete "DC/DC stage 470" and insert -- DC/DC stage 458 --, therefor.

In Column 11, Line 62, delete "$V_{CC}$" and insert -- $V_{DC}$ --, therefor.

In Column 12, Line 44, delete "$V_{AC}$" and insert -- $V_{DC}$ --, therefor.

Signed and Sealed this
Twenty-fifth Day of April, 2017

Michelle K. Lee
*Director of the United States Patent and Trademark Office*